Patented Aug. 22, 1944

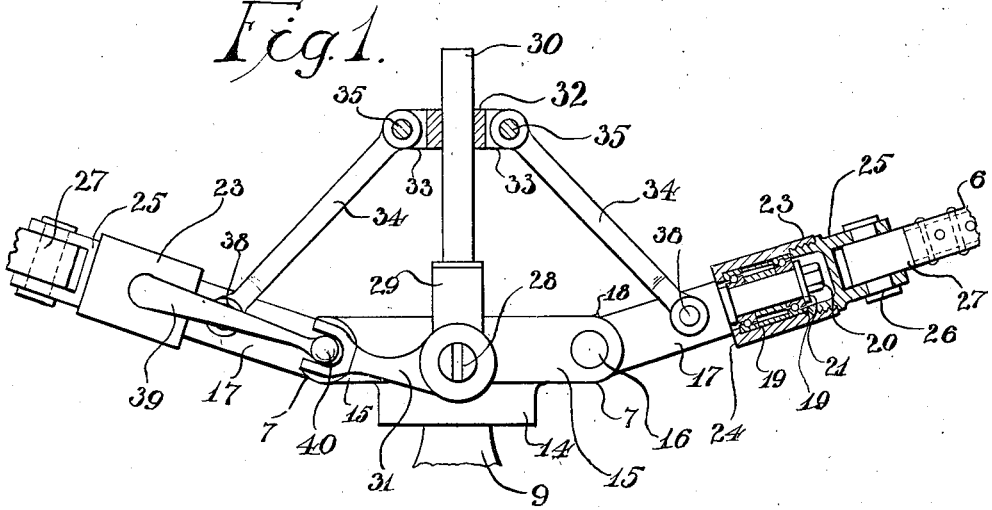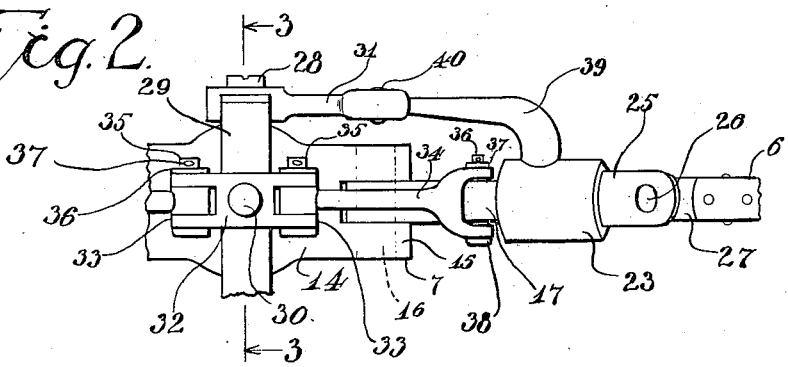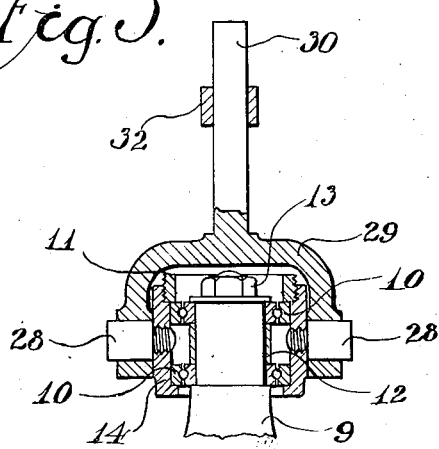

2,356,692

UNITED STATES PATENT OFFICE 2,356,692

ROTATIVE-WINGED AIRCRAFT

Haviland H. Platt, New York, N. Y., assignor to Rotary Research Corporation, Philadelphia, Pa., a corporation of Pennsylvania Application February 4, 1941, Serial No. 377,354

15 Claims. (Cl. 244—17)

My invention relates to lift rotors for aircraft, and more particularly to lift rotors wherein the blades are articulated so as to swing freely in the vertical plane under the influence of lift and centrifugal forces.

It is well known that one of the great advantages of the articulated rotor construction is the tendency to eliminate the rolling moment which is generated in forward flight by the more rapid relative air-speed of the advancing blade. The articulation allows the blade having greater lift to rise, thus reducing the effective angle of attack on it, and allows the blade having reduced lift to descend with corresponding increase of angle of attack. The discrepancy in air-speed is thus automatically compensated by an opposite discrepancy in angle of attack.

It is also well known, however, that in practice this balance has not been complete. The surface in which the blades rotate when in their equilibrium positions is of more or less conical form. The direction of the lift-force vector of the rotor as a whole lies in the axis of the rotor "cone." For a complete balance of the rolling side or force the tilting of the "cone" axis, under the influence of blade adjustment to forward speed, generally known as "flapping" must be confined to the longitudinal vertical plane. It has been found, however, that this has not been the case in practice, but that the "cone" axis tilts instead toward the side of the advancing blade as well as backwards. The lateral component of "cone" tilt, since it acts above the center of gravity of the aircraft, produces a rolling moment as well as a side force.

Many attempts have been made to correct the control difficulties resulting from the lateral "cone" tilt. None of these has been successful, however, in providing a reasonably complete balance over a wide range of aircraft and rotor speeds.

Some designs have introduced a cyclic pitch change opposing the lateral cone tilt by means of angled hinge pins. With such devices, however, a general change of pitch on all blades is unavoidable when there is a change in cone angle. It has been found that proportions giving satisfactory cyclic action necessarily lead to impracticable changes of general pitch also, and are of little or no value for that reason.

One object of my invention is to overcome these difficulties by means which provide a corrective influence substantially neutralizing the lateral unbalancing tendency under all flight conditions, while at the same time avoiding undesirable pitch change due to cone angle change.

Another object of my invention is to provide a simple mechanism applicable to known types of aircraft-supporting rotors; illustrative of the many possible practical embodiments of the broad aspects of my invention.

Another object of my invention is to provide means for correlating pitch variation with "flapping" substantially independent of cone angle.

Still another object of my invention is to provide means for correlating pitch variation and "flapping" substantially independent of cone angle while providing also any desired correlation of pitch angle to cone angle.

For the purpose of illustrating my invention, I have shown in the accompanying drawing more or less schematic views of one specific embodiment thereof.

Referring to the drawing in which like reference characters indicate like parts, Figure 1 represents a side elevational view, partly cross-sectioned on line 2—2 of Figure 3, of a simplified or schematic rotor head equipped with one form of my invention.

Figure 2 represents a plan view of the form shown in Figure 1.

Figure 3 represents a transverse cross-sectional view on line 3—3 of Figure 2.

The upright spindle 9, forming a portion of the structure of the aircraft as, for instance, a pylon or a shaft, may carry bearings 10 held in place by the nuts 11 and 13 and the spacer 12. The rotor hub 14, mounted to revolve freely on the bearings 10, is formed with lugs 15 which are bored out to receive the horizontal or "flapping" hinge-pins 16.

The hinge pins 16 are retained in bored holes in the blade stubs 17 by lock screws or set screws 18; the lugs 15 together with the pins 16 and the stubs 17 forming the horizontal articulation hinges for the free attachment of the rotor blades 6, the roots or "spars" of which are shown broken away in Figures 2 and 3. Mounted on the outer end of each blade stub 17 are bearings 19 retained thereon by any suitable means, as for instance by the nut 20, washer 21 and spacer 22. Supported on the bearings 19 is the cylindrical shell or housing 23. The shell 23 is retained on the bearings axially by the in-turned shoulder 24 and the forked member 25 which may be threaded and screwed into the shell 23 to act as a retaining nut and to serve as a firm and rigid connection between the revoluble shell 23 and the forked blade anchorage member 25. The forked member 25 is bored to receive the hinge-pin 26 cooperating with the blade root eye-fitting 27 to form a generally upright or vertical or "lagging" hinge for the articulation of the rotor blade generally in the surface swept by the blade. The fitting 27 is rigidly attached to the blade 6 by riveting or otherwise, as for instance, by telescoping the outer end of the member 27 into the tubular end of the blade-spar 6 and riveting through the telescoped ends. Thus rotation of the shell 23 on the bearings 19 causes rotation of the blade 6 generally about its axis, thus changing its pitch angle.

A rocking yoke 29 is pivotally mounted on the hub 14, by means of the screw-ended pins or trunnions 28, and has a guide rod 30 formed at the upper end thereof. Formed integrally with, or suitably attached to the yoke 29, are the fork-ended arms 31. Slidably fitting over the guide rod 30, is the slide 32 provided with opposite pairs of integral bored-out hinge lugs 33. The links 34 are pivotally attached to the lugs 33 by means of the pivot pins 35 which may be retained by washers 36 and cotter pins 37, or otherwise. The forked lower ends of the links 34 are pivotally attached in similar manner to the blade stubs 17 by the pivot pins 38. Formed integrally with, or otherwise rigidly attached to the revoluble shells 23 are the bent arms 39 formed with ball ends 40, which extend into and cooperate with the forked ends of the arms 31 of the rocking yoke 29; the centers of ball-ends 40 being located substantially in the extended axes of the hinge-pins 16.

In operation, the rise or fall of one blade 6, relative to the other, causes an angular or tilting displacement of the guide-rod 30 and of the forked arms 31. These in turn displace the ball-ends 40, thus causing rotation of the shells 23 and the blades 6, thereby changing their effective pitch; the pitch of one blade being increased while that of the other is decreased. On the other hand, a uniform rise or fall of both blades causes no change in pitch of either blade. If a uniform rise or fall of both blades takes place at the same time without a differential displacement between them, then the uniform change may produce a slight change in pitch on account of the displacement of the ball ends 40 from the axes of the pins 16. With practical proportions, however, this effect is so small as to be of no consequence.

The uniform rise and fall of the blades occurs with changes in "cone angle," while the differential displacement occurs cyclically with cone tilt, or "flapping." It follows, therefore, that the mechanism shown gives rise to a cyclic pitch change in phase with, and substantially proportional to "flapping," the pitch being at the same time substantially unaffected by change in "cone angle." In some rotor applications, such for example as in accelerated take-off of autorotative aircraft, it is desirable to have a change of pitch with "cone angle." This may be accomplished to any desired degree, and in either direct or inverse sense, by locating the forked levers 31 and ball ends 40 so that their centers of action are suitably offset from the axes of the flapping hinge-pins 16.

For purposes of illustration and exemplificaton, I have herein shown and described one specific form or embodiment of my invention, applied to a simplified, two-bladed, autorotative rotor, without showing any drive mechanism for starting. Obviously, the device may be readily adapted to rotors having any number of blades, power driven in flight or for starting, or constructed for any service to which articulated rotors may be put.

It has been shown that the device described is capable of causing a cyclic variation of pitch in phase with and substantially proportional to "flapping." It can furthermore be demonstrated both practically and theoretically that this is exactly the kind of action required to oppose the lateral unbalance. Furthermore, "flapping" and lateral unbalance are each caused by and are generally responsive to the translational velocity. Therefore, with the choice of suitable linkage proportions, the neutralizing effect of the cyclic pitch change responsive to "flapping" is substantially complete over the entire speed range of the aircraft.

While for purposes of illustration I have described a specific device which utilizes the close relationship between the longitudinal and lateral components of cone tilt for the purpose of causing cyclic pitch change to suppress the lateral component, it will be understood that my invention is not limited to this specific embodiment. Thus, the neutralizing tendency may in other forms of the device be derived from tilting of the rotor hub rather than by cyclic pitch change. Or in still other forms, the counteracting device may be actuated by linkage directly responsive to air-speed rather than through the intermediacy of flapping.

Having thus described the invention, what is hereby claimed as new and desired to be secured by Letters Patent is:

1. An aircraft lift rotor including a hub, a plurality of airfoil blades hingedly connected to said hub by a pivot permitting up-and-down motion of the blade and by a pivot permitting pitch-varying rotation of the blade, and means correlating pitch-angle of the blade with its cyclic flapping-angle, substantially uninfluenced by the cone angle of the blades.

2. An aircraft lift rotor including a hub, a plurality of airfoil blades hingedly connected to said hub by a pivot permitting up-and-down motion of the blade and by a pivot permitting pitch-varying rotation of the blade, and means correlating pitch-angle of the blade with its cyclic flapping-angle, substantially independently of cone angle of the blades, said means also correlating pitch-angle and cone-angle.

3. An aircraft lift rotor including a hub, a plurality of airfoil blades hingedly connected to said hub by a pivot permitting up-and-down motion of the blade and by a pivot permitting pitch-varying rotation of the blade, and means correlating pitch-angle of the blade with its cyclic flapping-angle substantially independently of the cone angle of the blades.

4. An aircraft lift rotor including a hub, a plurality of airfoil blades hingedly connected to said hub by a pivot permitting up-and-down motion of the blade and by a pivot permitting pitch-varying rotation of the blade, and means for neutralizing lateral unbalance of the rotor due to the cyclic flapping of the blades, said neutralizing means being responsive to the cyclic flapping of the blades and being substantially independent of coning.

5. An aircraft lift rotor including a hub, a plurality of airfoil blades hingedly connected to said hub by a pivot permitting up-and-down motion of the blade and by a pivot permitting pitch-varying rotation of the blade, and means for neutralizing lateral unbalance of the rotor due to the cyclic flapping of the blades, said neutralizing means being responsive to the cyclic flapping of the blades and being substantially independent of coning, and means correlating pitch angle and cone angle.

6. An aircraft lift rotor including a hub, a plurality of airfoil blades hingedly connected to said hub by a pivot permitting up-and-down motion of the blade and by a pivot permitting pitch-varying rotation of the blade, and means for neutralizing lateral unbalance due to translational velocity, said neutralizing means being responsive to translational velocity but substantially not to cone angle.

7. An aircraft lift rotor including a hub, a plurality of airfoil blades hingedly connected to said hub by a pivot permitting up-and-down motion of the blade and by a pivot permitting pitch-varying rotation of the blade, and means for neutralizing lateral unbalance due to translational velocity, said neutralizing means being responsive to translational velocity but substantially not to cone angle, and means correlating pitch angle and cone angle.

8. An aircraft lift rotor comprising a hub, a plurality of blades pivotally attached to said hub so as to allow angular displacement from the plane of rotation, pivotal mountings for the blades permitting change of pitch, and means correlating angular displacement of the blades to pitch change, said correlating means being more responsive to differential angular displacements between blades than to equal displacements of all the blades.

9. An aircraft lift rotor comprising a hub, a plurality of blades pivotally attached to said hub so as to allow angular displacement from the plane of rotation and to allow pitch change, the blades being interconnected in such a way that the pitch of each blade is dependent on its angular position relative to one or more of the other blades.

10. An aircraft lift rotor comprising a hub, a plurality of blades pivotally attached to said hub so as to allow substantially vertical swinging means for permitting feathering motion of said blades, a guide member pivoted substantially centrally of the hub, a slide member arranged to slide generally vertically on said guide member, pivoted links connecting each blade to said guide member and means connected to said guide member inter-relating it with the feathering of the blades.

11. An aircraft lift rotor including a hub, a plurality of airfoil blades each pivotally connected to said hub for up-and-down motion to permit the general coning of the blades and to permit cyclic flapping of the blades, and for pitch-varying rotation of each blade, a tiltable cone-axis member carried by said hug generally in line with the hub axis but capable of being tilted out of said hub axis at an acute angle thereto, similar centering connections between each of said blades and said cone-axis member for maintaining said cone-axis member centered generally equidistantly between the blades, and a pitch-varying connection between said cone-axis member and each of said blades for differentially varying the pitch of the blades on opposite sides of their orbit responsive to the tilting of said cone-axis member out of the hub axis by corresponding pitch-varying rotational displacements of the blades.

12. An aircraft lift rotor including a hub, a plurality of airfoil blades, a connecting stub intermediate each blade and the hub, pivotal connections between each stub and the hub and between the stub and the blade for permitting up-and-down motion of each blade in relation to the hub and for permitting pitch-varying rotational displacement of each blade in respect to the hub and for permitting to-and-fro motion of each blade relative to the hub generally in the surface of rotation of the blade, a tiltable cone-axis defining member carried by said hub generally in line with the hub axis but capable of beng tilted out of said hub axis, means for centering said cone-axis defining member between the blades substantially in the virtual axis of the cone swept blades, and means intermediate said cone-axis defining member and each of said blades for differentially varying the pitch of the blades on opposite sides of their orbit responsive to the tilting of the cone-axis defining member in respect to the hub axis by corresponding pitch-varying rotational displacements of the blades.

13. An aircraft lift rotor including a hub, a plurality of blade-connecting stubs pivotally secured to said rotor by pivots permitting an up-and-down motion of the stub in relation to the hub, corresponding airfoil blades pivotally connected to said blades by pivotal connections permitting to-and-fro motion relative to each stub generally in the surface of rotation of the blade, a pitch-varying pivot for permitting pitch-varying rotational displacements of the blades in respect to the hub, tiltable cone-axis defining means disposed generally in line with the hub axis but capable of being tilted out of said hub axis, means for centering said cone-axis defining means between the blades generally in the virtual axis of the cone-swept by the blades, and means for differentially varying the pitch of the blades on opposite sides of their orbit responsive to the tilting of said cone-axis defining means in respect to the hub axis by corresponding pitch-varying rotational displacements of the blades, for neutralizing lateral unbalance due to translational velocity of the rotor.

14. An aircraft lift rotor including a hub, a plurality of blade-connecting stubs pivotally secured to said rotor by pivots permitting an up-and-down motion of the stub in relation to the hub, corresponding airfoil blades pivotally connected to said blades by pivotal connections permitting to-and-fro motion relative to each stub generally in the surface of rotation of the blade, a pitch-varying pivot for permitting pitch-varying rotational displacements of the blades in respect to the hub, tiltable cone-axis defining means disposed generally in line with the hub axis but capable of being tilted out of said hub axis, means for centering said cone-axis defining means between the blades generally in the virtual axis of the cone swept by the blades, and means for differentially varying the pitch of the blades on opposite sides of their orbit responsive to the tilting of said cone-axis defining means in respect to the hub axis by corresponding pitch-varying rotational displacements of the blades, generally irrespective of the cone-angle of the rotor, for neutralizing lateral unbalance due to translational velocity of the rotor.

15. An aircraft lift rotor including a revoluble hub, a plurality of airfoil blades each pivotally connected to said hub for up-and-down motion relative to the hub to permit the general coning of the blades and to permit cyclic flapping of the blades, and for pitch-varying rotational displacements of each blade relative to the hub, a tiltable centering post carried by said hub generally in line with the hub axis but capable of being tilted out of said hub axis, a member slidably carried by said post and moveable longitudinally thereof, similar links intermediate said blades and said slidable member for causing said slidable member to move up-and-down in relation to said post as the cone angle of the rotor blades decreases and increases, respectively, said links being pivotally connected at their opposite ends, said slidable member serving to maintain said post generally in the virtual axis of the cone swept by the blades, pitch-varying arms having their inner ends approximately in the extended axes of the pivots which permit the up-and-down motion of the plades, arms connected with said centering post having articulated connection with the inner ends of said pitch-varying arms generally in the extended axes of the pivots which permit the up-and-down motion of the blades; said pitch-varying arms being operatively connected with the revoluble portions of the pivotal connections which permit the pitch-varying rotational displacements of the blades.

HAVILAND H. PLATT.